(12) United States Patent
Epperlein et al.

(10) Patent No.: US 12,493,097 B2
(45) Date of Patent: Dec. 9, 2025

(54) OPTICS-BASED CORRECTION OF THE POSITION OF A MOBILE UNIT

(71) Applicant: TRUMPF Tracking Technologies GmbH, Ditzingen (DE)

(72) Inventors: Peter Epperlein, Leonberg (DE); Ferdinand Baaij, Ditzingen (DE)

(73) Assignee: TRUMPF TRACKING TECHNOLOGIES GMBH, Ditzingen (DE)

( * ) Notice: Subject to any disclaimer, the term of this patent is extended or adjusted under 35 U.S.C. 154(b) by 315 days.

(21) Appl. No.: 18/454,252

(22) Filed: Aug. 23, 2023

(65) Prior Publication Data

US 2023/0393233 A1    Dec. 7, 2023

Related U.S. Application Data

(63) Continuation of application No. PCT/EP2022/053912, filed on Feb. 17, 2022.

(30) Foreign Application Priority Data

Feb. 25, 2021   (DE) ............. 10 2021 201 799.1

(51) Int. Cl.
  *G01S 5/02*   (2010.01)
  *G01S 5/16*   (2006.01)
  *H04W 64/00*  (2009.01)
(52) U.S. Cl.
  CPC ............ *G01S 5/0264* (2020.05); *G01S 5/163* (2013.01); *H04W 64/003* (2013.01)
(58) Field of Classification Search
  CPC .......... G01S 5/0264; G01S 5/163; G01S 5/16; H04W 64/003

USPC ....................................................... 455/456.1
See application file for complete search history.

(56) References Cited

U.S. PATENT DOCUMENTS

| 6,246,884 B1 * | 6/2001 | Karmi ................. | H04W 64/00 455/457 |
| 6,748,226 B1 * | 6/2004 | Wortham ............. | G01S 19/071 342/450 |
| 7,812,766 B2 * | 10/2010 | Leblanc ................. | G01S 1/026 701/408 |

(Continued)

FOREIGN PATENT DOCUMENTS

| CN | 110189069 A | 8/2019 |
| DE | 102010041548 A1 | 3/2012 |

(Continued)

*Primary Examiner* — Mahendra R Patel
(74) *Attorney, Agent, or Firm* — LEYDIG, VOIT & MAYER, LTD.

(57) ABSTRACT

A method locates a mobile unit in an industrial manufacturing environment. The method includes: A) rough locating of the mobile unit by way of rough position data of a manufacturing execution system (MES); B) moving a sensor unit comprising a sensor to the mobile unit on a basis of the rough position data; C) receiving a coded signal emitted by the mobile unit by way of the sensor and finely locating the mobile unit, wherein the sensor ascertains the position of a first transmitter of the coded signal and provides the first position in the form of signal position data; and D) identifying the mobile unit on a basis of the coded signal and correcting the rough position data on a basis of the signal position data.

18 Claims, 2 Drawing Sheets

(56) References Cited

U.S. PATENT DOCUMENTS

| | | | | |
|---|---|---|---|---|
| 8,385,964 | B2* | 2/2013 | Haney | H04W 4/14 |
| | | | | 455/457 |
| 9,277,366 | B2* | 3/2016 | Busch | G06F 16/9537 |
| 9,358,685 | B2* | 6/2016 | Meier | B25J 9/163 |
| 9,739,882 | B2* | 8/2017 | Strong | G01S 15/62 |
| 9,805,183 | B2* | 10/2017 | Narasimha | H04W 4/80 |
| 11,635,219 | B2* | 4/2023 | Ootsuka | F24F 11/30 |
| | | | | 700/276 |
| 11,743,696 | B2* | 8/2023 | Bollard | H04B 1/7183 |
| | | | | 375/130 |
| 11,964,370 | B2* | 4/2024 | Kobayashi | B25B 13/463 |
| 12,089,122 | B2* | 9/2024 | Wahl | H04B 7/2678 |
| 2003/0083964 | A1 | 5/2003 | Horwitz | G06Q 10/087 |
| | | | | 705/28 |
| 2007/0037582 | A1* | 2/2007 | Mohi | G01S 19/51 |
| | | | | 455/456.1 |
| 2008/0119208 | A1* | 5/2008 | Flanagan | G01S 5/02585 |
| | | | | 455/456.6 |
| 2009/0102613 | A1 | 4/2009 | Fontanot | |
| 2010/0014784 | A1* | 1/2010 | Silverbrook | G06V 30/142 |
| | | | | 382/313 |
| 2010/0138017 | A1* | 6/2010 | Vrba | G05B 19/4188 |
| | | | | 700/97 |
| 2011/0200245 | A1* | 8/2011 | Crothers | G05B 19/4183 |
| | | | | 382/141 |
| 2011/0231094 | A1* | 9/2011 | Simon | G01S 5/16 |
| | | | | 701/469 |
| 2017/0169672 | A1* | 6/2017 | Farrow | G06K 7/10366 |
| 2017/0313517 | A1 | 11/2017 | Agarwal et al. | |
| 2018/0091221 | A1* | 3/2018 | Bitra | G01S 5/163 |
| 2019/0166453 | A1* | 5/2019 | Edge | G01S 5/06 |
| 2019/0171780 | A1* | 6/2019 | Santarone | G02B 27/0093 |
| 2020/0201303 | A1 | 6/2020 | Kiefer et al. | |
| 2020/0208989 | A1* | 7/2020 | Ottnad | H04W 4/029 |
| 2020/0209836 | A1* | 7/2020 | Bauer | G06Q 50/04 |
| 2020/0218235 | A1* | 7/2020 | Kiefer | G01S 5/021 |

FOREIGN PATENT DOCUMENTS

| | | | | |
|---|---|---|---|---|
| DE | 102016006459 | A1 | 2/2017 | |
| DE | 102017120382 | B3 | 10/2018 | |
| DE | 102017120381 | A1 | 3/2019 | |
| DE | 102017121098 | A1 * | 3/2019 | G05B 19/41865 |
| DE | 102018110074 | A1 * | 10/2019 | G06Q 50/04 |
| EP | 1736793 | A1 * | 12/2006 | G01S 5/14 |
| EP | 1329125 | B1 * | 1/2007 | H04W 64/00 |
| EP | 2051189 | A1 | 4/2009 | |
| EP | 2380709 | A2 * | 10/2011 | F16P 3/142 |
| EP | 3336574 | A1 | 6/2018 | |
| EP | 3486849 | A1 | 5/2019 | |
| EP | 3336574 | B1 * | 5/2020 | G01S 1/7038 |
| KR | 20130143155 | A | 12/2013 | |
| WO | WO-2007059301 | A2 * | 5/2007 | H04N 23/63 |
| WO | WO-2010149796 | A1 * | 12/2010 | G01S 5/021 |
| WO | WO-2015183490 | A1 * | 12/2015 | G01S 5/16 |
| WO | WO-2016011149 | A1 * | 1/2016 | G01S 5/163 |
| WO | WO 2019048149 | A1 | 3/2019 | |

* cited by examiner

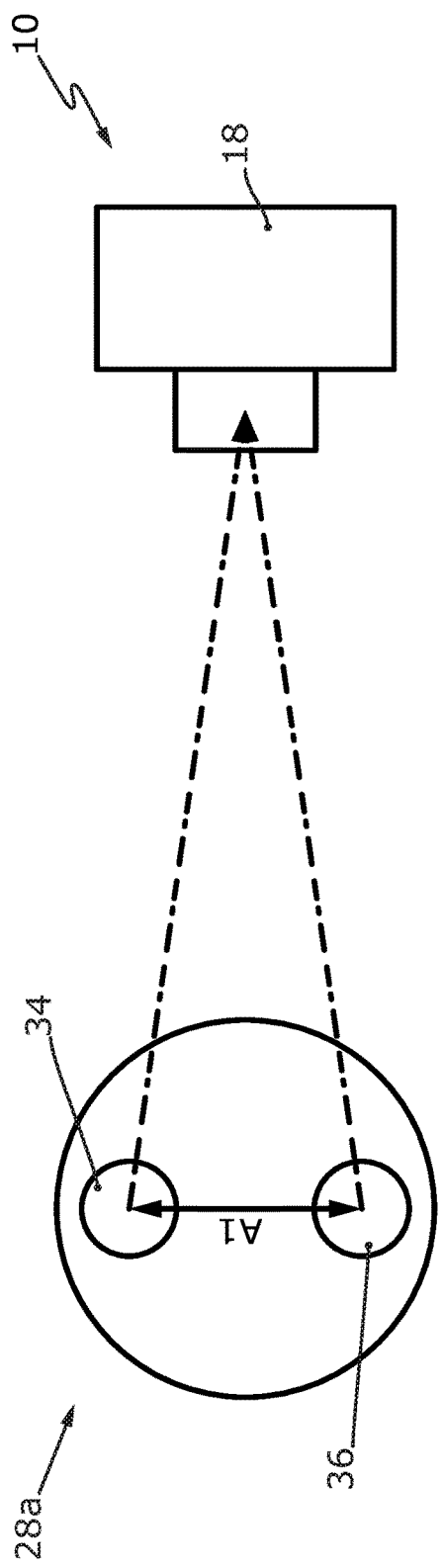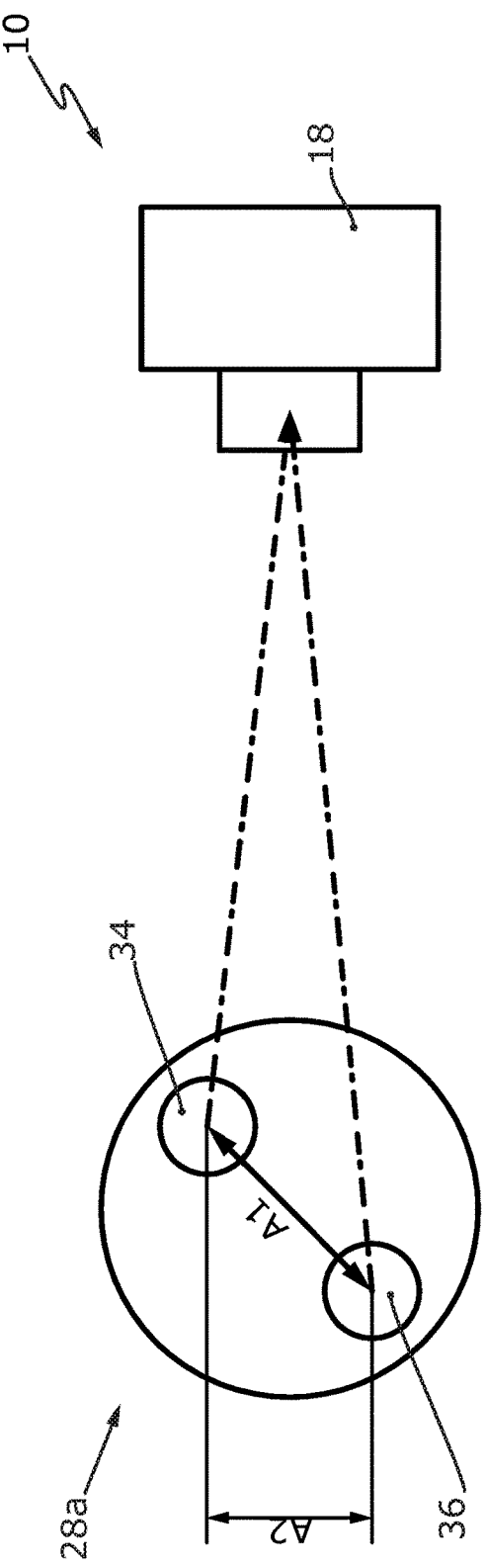
Fig. 2a
Fig. 2b

OPTICS-BASED CORRECTION OF THE POSITION OF A MOBILE UNIT

CROSS REFERENCE TO RELATED APPLICATIONS

This application is a continuation of International Application No. PCT/EP2022/053912 (WO 2022/179927 A1), filed on Feb. 17, 2022, and claims benefit to German Patent Application No. DE 10 2021 201 799.1, filed on Feb. 25, 2021. The aforementioned applications are hereby incorporated by reference herein.

FIELD

The present disclosure relates to a method for locating a mobile unit in an industrial manufacturing environment. The present disclosure furthermore relates to a device for locating a mobile unit in an industrial manufacturing environment.

BACKGROUND

Locating a mobile unit in an industrial manufacturing environment, for example, to find a collective carrier, is known, in particular from WO 2019/048149 A1. Although the locating of the mobile unit is already comparatively precise, this accuracy is not yet sufficient to enable completely autonomous manufacturing. In practice, static boundaries, for example in the form of stops, are therefore set up in the industrial manufacturing environment, in particular to position collective carriers. However, this in turn significantly limits the flexibility of the industrial manufacturing environment with regard to rapidly changing orders in small lot sizes.

SUMMARY

In an embodiment, the present disclosure provides a method that locates a mobile unit in an industrial manufacturing environment. The method includes: A) rough locating of the mobile unit by way of rough position data of a manufacturing execution system (MES); B) moving a sensor unit comprising a sensor to the mobile unit on a basis of the rough position data; C) receiving a coded signal emitted by the mobile unit by way of the sensor and finely locating the mobile unit, wherein the sensor ascertains the position of a first transmitter of the coded signal and provides the first position in the form of signal position data; and D) identifying the mobile unit on a basis of the coded signal and correcting the rough position data on a basis of the signal position data.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

FIG. 2a shows a schematic view of a mobile unit having a first transmitter and a second transmitter; and FIG. 2b shows the view according to FIG. 2a with rotated mobile unit to demonstrate the rotational orientation determination of the mobile unit.

DETAILED DESCRIPTION

Figure 1:
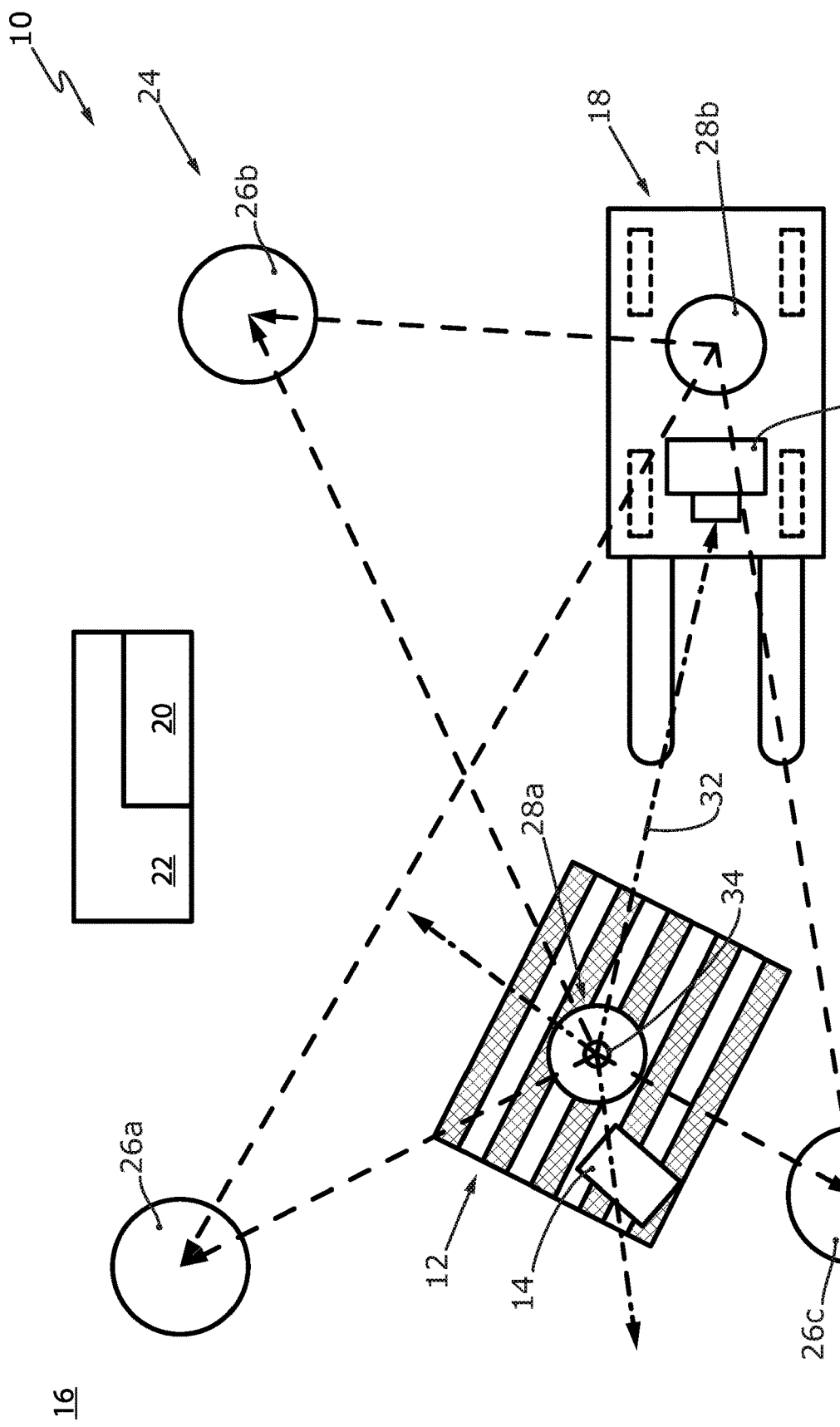
FIG. 1 shows a schematic view of a device according to the present disclosure for carrying out the method according to the invention.

Aspects of the present disclosure provide a method and a device for fine locating of a mobile unit, which enable rigid boundaries in the industrial manufacturing environment to be at least substantially eliminated.

An aspect of the present disclosure provides a method for locating a mobile unit in an industrial manufacturing environment comprising the following method steps:
  A) rough locating of the mobile unit on the basis of rough position data of a manufacturing execution system (MES);
  B) moving a sensor unit to the mobile unit on the basis of the rough position data;
  C) transmitting a coded signal by way of a first transmitter of the mobile unit, receiving the signal by way of a sensor of the sensor unit, and ascertaining the position of the first transmitter in the form of signal position data;
  D) identifying the mobile unit on the basis of the coded signal and correcting the rough position data on the basis of the signal position data.

The mobile unit can be located particularly precisely due to the determination of the position data of the mobile unit (of the tracker/tag/marker) carried out in two different ways. It is ensured here on the basis of the coding of the coded signal that the rough position data and the signal position data originate from the same object, namely the mobile unit.

The mobile unit can be identified and the signal position data can be ascertained here in arbitrary sequence or simultaneously.

The sensor unit can be controlled by the MES. The MES can communicate in a wireless and/or wired manner with the sensor unit.

The method is preferably carried out in a sheet metal processing facility and/or on a shop floor.

The mobile unit does not have to be part of a locating system. Alternatively thereto, a locating system having multiple anchors for time-of-flight determination of a signal from the mobile unit can provide the rough position data to the MES.

The locating system includes anchors (beacons/satellites) here for locating the mobile unit, in particular by triangulation. The rough position data can be ascertained in method step A) by a locating system in the form of an ultra broadband measuring system and/or by a locating system in the form of a Bluetooth measuring system. The locating system can be designed in the form of an indoor locating system (indoor GPS/real-time localization system). The locating system can include a low energy Bluetooth measuring system. The locating system is preferably designed to determine the rough position data of the mobile unit with an accuracy of less than 1 m, in particular of less than 0.4 m.

Alternatively or additionally thereto, the MES can ascertain the rough position data from an accounting. The accounting can be the last feedback which the mobile unit and/or a driverless vehicle has communicated to the MES. The rough position data is thus acquired in a particularly technically simple manner.

The sensor unit can include a driverless transport vehicle.

The mobile unit can be located on and/or at a collective carrier. The sensor unit is preferably moved in consideration, in particular for transport, of the collective carrier (of the load carrier/the pallet). The collective carrier is particularly preferably loaded on the sensor unit and/or the collective carrier is unloaded from the sensor unit. The driverless transport vehicle can be designed for vertically moving the collective carrier. In particular, the transport vehicle can be designed in the form of a forklift.

A simplification of the method is achieved if the coded signal is emitted in the form of a coded light signal. The light signal can be emitted in the visible range.

A further design simplification is achieved if the coded signal is received by the sensor in the form of a camera. In this case, the signal position data can be determined on the basis of a camera image.

The sensor unit can include a handheld device. Handheld device means a device which is configured to be held in the hand by a user, to output and display, as well as record, data and/or information with this user here, and to exchange data and information, in particular digitally and wirelessly, with other devices and to process data. The handheld device can be designed in the form of a smart phone. A camera integrated in the handheld device or smart phone is particularly preferably used as the sensor in the form of a camera.

The handheld device can include a display, on which the mobile unit is displayed when it is recorded by the camera. Finding the mobile unit by a user of the handheld device is significantly facilitated by such a live image of the mobile unit.

In a particularly preferred embodiment of the present disclosure, the mobile unit is highlighted, marked, and/or provided with an inscription on the display. The highlighting of the mobile unit achieved in this way by means of augmented reality significantly facilitates rapidly finding the mobile unit. In particular, the mobile unit can be provided with context information on the display.

In a further preferred embodiment of the present disclosure, the mobile unit can include a second transmitter offset by a distance from the first transmitter, which emits a second signal received by the sensor. The MES concludes the rotational orientation of the mobile unit from the distance of the first transmitter to the second transmitter effectively measured by the sensor. The second signal can be provided in the form of a coded or uncoded signal. The second signal is preferably emitted in the form of a light signal, in particular a light signal in the visible range.

The method according to the present disclosure can furthermore comprise, in a method step E), creating a recording of the environment of the mobile unit by way of the sensor unit and analyzing the recording, in particular by way of the MES. The recording is preferably created here using the above described sensor, in particular in the form of the camera, for receiving the coded signal. The analysis can be performed by an algorithm having an artificial intelligence or a trained neural network. The sensor unit can be moved in a further method step F) on the basis of the analyzed recording. Particularly precise navigating is enabled in this way.

An aspect of the present disclosure provides a device, in particular for carrying out a method described here. The device includes a mobile unit having a first transmitter for emitting a coded signal, an MES for providing rough position data of the mobile unit, a mobile sensor unit having a sensor for receiving the coded signal and for ascertaining the position of the first transmitter on the basis of the coded signal, and a control unit for controlling the sensor unit on the basis of the rough position data, wherein the control unit is designed to identify the mobile unit on the basis of the coded signal, to ascertain signal position data of the transmitter, and to correct the rough position data on the basis of the signal position data.

The control unit can be part of the manufacturing execution system (MES) of the device. The device can include a sheet metal processing facility and/or a shop floor.

The MES can be designed to ascertain the rough position data on the basis of an accounting. Alternatively or additionally thereto, the device can include a locating system for providing the rough position data. The locating system can be designed in the form of an ultra-broadband measuring system and/or a Bluetooth measuring system.

The mobile unit can include an e-ink display for displaying manufacturing data.

The sensor unit can include a driverless transport vehicle. The sensor unit is preferably designed in the form of a driverless transport vehicle.

To ascertain the rotational orientation of the mobile unit, the mobile unit can include a second transmitter offset from the first transmitter, which is designed to transmit a second signal receivable by the sensor, wherein the MES is designed to conclude the rotational orientation of the mobile unit from the effectively measurable distance of the two transmitters.

The sensor can be designed to record the coded signal and/or to record the environment of the mobile unit in the form of a camera. The MES can be designed, in particular using a neural network, to analyze the recording of the environment and to navigate the sensor unit on the basis of the analyzed recording.

The sensor unit can include a handheld device. The sensor unit can be designed in the form of a handheld device. The handheld device can be designed in the form of a smart phone. The handheld device can include a first sensor in the form of a camera, which is in particular integrated in the handheld device. The handheld device can include a display in order to display a recording of the mobile unit recorded by the camera. The handheld device can be designed to highlight, mark, and/or provide with an inscription the recording of the mobile unit displayed on the display.

Further advantages of aspects of the present disclosure are evident from the description and the drawings. Similarly, according to aspects of the present disclosure, the features mentioned above and those yet to be explained further can be used in each case individually or together in any desired combinations. The embodiments shown and described should not be understood as an exhaustive list, but rather are of an exemplary character for outlining aspects of the present disclosure.

FIG. 1 shows a device 10 having a collective carrier 12. The collective carrier 12 can be designed to receive a workpiece 14 in the form of a pallet. The collective carrier 12 is located in an industrial manufacturing environment 16 in the form of a sheet metal processing facility or a shop floor.

In the present case, the collective carrier 12 is to be moved by a sensor unit 18. The sensor unit 18 is designed here in the form of a driverless vehicle. The sensor unit 18 is controlled by a control unit 20. The control unit 20 is part of a manufacturing execution system (MES) 22.

The precise control of the sensor unit 18 normally requires static stops. To enable flexible manufacturing, such static stops are to be avoided as much as possible, however. According to an aspect of the present disclosure, particularly precise locating of the collective carrier 12 is therefore proposed.

The MES 22 initially guides the sensor unit 18, which is connected with respect to data to the MES 22, in a method step A) roughly to the collective carrier 12. The MES 22 can receive the information on the rough position of the collective carrier 12, i.e., rough position data, from an accounting. Alternatively or additionally thereto, the MES 22 can receive the rough position data from a locating system 24.

The locating system 24 can include multiple anchors 26a, 26b, 26c. Furthermore, the locating system 24 can include a mobile unit 28a at the collective carrier 12 and a further mobile unit 28b at the sensor unit 18. The mobile units 28a, b are locatable by the anchors 26a-c.

After the sensor unit 18 has been moved in a method step B) at least into the vicinity of the collective carrier 12 or the mobile unit 28a, a sensor 30 of the sensor unit 18 receives, in a method step C), a coded signal 32 of the mobile unit 28a. The mobile unit includes a first transmitter 34 for transmitting the coded signal 32. The mobile unit 28a is identifiable on the basis of the coded signal 32. The coded signal 32 furthermore permits the ascertainment of precise signal position data. The signal position data permit the correction of the rough position data in a method step D), so that the sensor unit 18 is movable precisely to the collective carrier 12 or to the mobile unit 28a.

The sensor 30 is preferably designed in the form of a camera. The first transmitter 34 is preferably designed to emit the coded signal 32 in the form of a light beam, which is visible in particular.

Moving the sensor unit 18 is furthermore facilitated if, in a method step E), in particular using the sensor 30, a recording of the environment of the mobile unit 28a is created and analyzed. An algorithm having a neural network, in particular in the MES 22, can be used for the analysis here. The sensor unit 18 can then be moved further, in a method step F), on the basis of the analyzed recording.

FIG. 2a shows a part of a device 10 having a sensor unit 18 and a mobile unit 28a, wherein the mobile unit 28a includes a second transmitter 36 in addition to a first transmitter 34. The two transmitters 34, 36 are arranged at a known distance A1. The distance A1 is detected in FIG. 2a by the sensor 30, which is designed here as a camera, as the effective distance of the two transmitters 34, 36.

FIG. 2b shows the device 10 according to FIG. 2a, but with pivoted mobile unit 28a. In this case, the sensor unit 18 does not detect the distance A1 as the effective distance of the two transmitters 34, 36, but rather the distance A2. From a comparison of the distances A1 and A2, it is possible for the sensor unit 18 and/or the MES 22 (see FIG. 1) to ascertain the rotational orientation of the mobile unit 28a.

If all figures of the drawing are considered together, aspects of the present disclosure relate to a method for precise locating of a mobile unit 28a and for navigating a sensor unit 18 relative to the mobile unit 28a. The method includes the rough navigation of the sensor unit 18 to the mobile unit 28a by way of an MES 22. The MES 22 can receive the rough position data required for this purpose from an accounting and/or a locating system 24. The mobile unit 28a includes a first transmitter 34, which is designed to transmit a coded signal 32. This coded signal 32 is received by a sensor 30 of the sensor unit 18. The mobile unit 28a is identified and its signal position data are ascertained on the basis of the coded signal 32. The MES 22 can be designed to further navigate the sensor unit 18 on the basis of the precise signal position data. Aspects of the present disclosure furthermore relate to a device 10 for corresponding navigation of a sensor unit 18.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g.,

LIST OF REFERENCE SIGNS 10 device
12 collective carrier
14 workpiece
16 industrial manufacturing environment
18 sensor unit
20 control unit
22 Manufacturing Execution System (MES)
24 locating system
26a-c anchors
28a mobile unit
28b further mobile unit
30 sensor
32 coded signal
34 first transmitter
36 second transmitter
A1 actual distance between first transmitter 34 and second transmitter 36
A2 effective distance between first transmitter 34 and second transmitter 36

The invention claimed is:

1. A method for locating a mobile unit in an industrial manufacturing environment, the method comprising:
   A) rough locating of the mobile unit by way of rough position data of a manufacturing execution system (MES);
   B) moving a sensor unit comprising a sensor to the mobile unit on a basis of the rough position data;
   C) receiving a coded signal emitted by the mobile unit by way of the sensor and finely locating the mobile unit, wherein the sensor ascertains the position of a first transmitter of the coded signal and provides the first position in the form of signal position data; and
   D) identifying the mobile unit on a basis of the coded signal and correcting the rough position data on a basis of the signal position data.

2. The method according to claim 1, wherein the locating system provides the rough position data to the MES, wherein the locating system comprises multiple anchors for time-of-flight determination of a signal from the mobile unit.

3. The method according to claim 1, wherein the MES ascertains the rough position data from an accounting.

4. The method according to claim 1, wherein the sensor unit in method step B) further comprises a driverless transport vehicle.

5. The method according to claim 1, wherein the mobile unit is located on and/or at a collective carrier.

6. The method according to claim 1, wherein the coded signal in method step C) is emitted in the form of a coded light signal.

7. The method according to claim 6, wherein the coded signal in method step C) is received by the sensor, which is a camera.

8. The method according to claim 1, wherein the sensor unit in method step B) comprises a handheld device.

9. The method according to claim 6, wherein the mobile unit, when it is acquired by the sensor in the form of a camera, is displayed on a display of the mobile unit.

10. The method according to claim 9, wherein the mobile unit displayed on the display is highlighted, marked, and/or provided with an inscription on the display.

11. The method according to claim 1, wherein the mobile unit comprises a second transmitter offset by a known distance from the first transmitter, which transmits a second signal received by the sensor, wherein the MES concludes the rotational orientation of the mobile unit from the actual measured distance of the first transmitter to the second transmitter.

12. The method according to claim 1, wherein the following method step is carried out before or after method step D):
E) creating a recording of the environment of the mobile unit by way of the sensor unit and analyzing the recording.

13. A device for locating a mobile unit in an industrial manufacturing environment, in particular for carrying out a method according to claim 1, wherein the device includes the following:
a) a mobile unit having a first transmitter for emitting a coded signal;
b) an MES for providing rough position data of the mobile unit;
c) a mobile sensor unit having a sensor for receiving the coded signal and for ascertaining the position of the first transmitter of the coded signal; and
d) a control unit for controlling the sensor unit on the basis of the rough position data, wherein the control unit is designed to identify the mobile unit on the basis of the coded signal, to ascertain signal position data of the first transmitter of the coded signal, and to correct the rough position data on the basis of the signal position data.

14. The device according to claim 13, wherein the device comprises a locating system configured to provide the rough position data to the MES.

15. The device according to claim 13, wherein the mobile unit comprises an e-ink display configured to display manufacturing data.

16. The device according to claim 13, wherein the sensor unit comprises a driverless transport vehicle and/or a handheld device.

17. The device according to claim 13, wherein the mobile unit comprises a second transmitter offset by a known distance from the first transmitter, which is designed to transmit a second signal receivable by the sensor, wherein the MES is configured to conclude the rotational orientation of the mobile unit from the actual measurable distance of the first transmitter to the second transmitter.

18. The device according to claim 13, wherein the sensor is designed to record the coded signal and/or to record the environment of the mobile unit in the form of a camera.

* * * * *